United States Patent
Shen

(10) Patent No.: US 7,988,390 B2
(45) Date of Patent: Aug. 2, 2011

(54) PRECISION MACHINE UTILIZING IMAGING SYSTEM

(75) Inventor: Hung-Tsan Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 395 days.

(21) Appl. No.: 12/342,246

(22) Filed: Dec. 23, 2008

(65) Prior Publication Data

US 2009/0314146 A1 Dec. 24, 2009

(30) Foreign Application Priority Data

Jun. 20, 2008 (CN) .......................... 2008 1 0302259

(51) Int. Cl.
*B23C 9/00* (2006.01)
*B23Q 11/00* (2006.01)
*F16M 13/00* (2006.01)

(52) U.S. Cl. ............ 409/134; 409/214; 408/16; 83/521; 248/160; 248/274.1; 248/206.5

(58) Field of Classification Search ................. 409/134, 409/210, 214, 218, 186–188, 193–195, 207–208; 408/16, 13; 700/180, 174, 178, 184; 248/160, 248/274.1, 276.1, 693, 206.5; 83/520, 521; 82/173; 451/6, 8–9, 442
See application file for complete search history.

(56) References Cited

U.S. PATENT DOCUMENTS

| | | | | |
|---|---|---|---|---|
| 3,383,491 A * | 5/1968 | Muncheryan | ............ | 219/121.63 |
| 4,887,193 A * | 12/1989 | Dieckmann | ...................... | 408/16 |
| 6,059,494 A * | 5/2000 | Susnjara | ........................ | 409/134 |
| 6,073,058 A * | 6/2000 | Cossen et al. | ................. | 700/184 |
| 6,352,227 B1 * | 3/2002 | Hathaway | ...................... | 248/160 |
| 6,799,356 B2 * | 10/2004 | Sanchez | ........................ | 409/134 |
| 7,131,800 B2 * | 11/2006 | Anderson et al. | ............. | 409/134 |
| 2002/0054800 A1 * | 5/2002 | Hwu et al. | ...................... | 409/134 |
| 2006/0156888 A1 * | 7/2006 | Ushiwata et al. | ............... | 83/581 |
| 2006/0249649 A1 * | 11/2006 | Volk et al. | ...................... | 248/917 |

FOREIGN PATENT DOCUMENTS

| | | |
|---|---|---|
| CN | 1119424 | 3/1996 |
| JP | 2004-34280 | 2/2004 |
| JP | 2004-249436 | 9/2004 |

OTHER PUBLICATIONS

Machine translation of JP-2004-249436, which JP '436 was published Sep. 2004.*
Machine Translation of JP-2004-034280, which JP '280 was published Feb. 2004.*

* cited by examiner

*Primary Examiner* — Erica E Cadugan
(74) *Attorney, Agent, or Firm* — Clifford O. Chi

(57) ABSTRACT

A precision machine includes a base having an outer wall, a cutting tool for machining a workpiece mounted on the base, a fixing member detachably located on the outer wall, a first connecting member having a first end and a second end and an imaging system. The first connecting member is capable of maintaining a shape after adjustment thereto by application of an external force, and the first end of the first connecting member is fixed to the fixing member. The imaging system is attached to the second end of the first connecting member such that a position of the imaging system relative to the tool can be adjusted by changing shape of the connecting member.

8 Claims, 3 Drawing Sheets

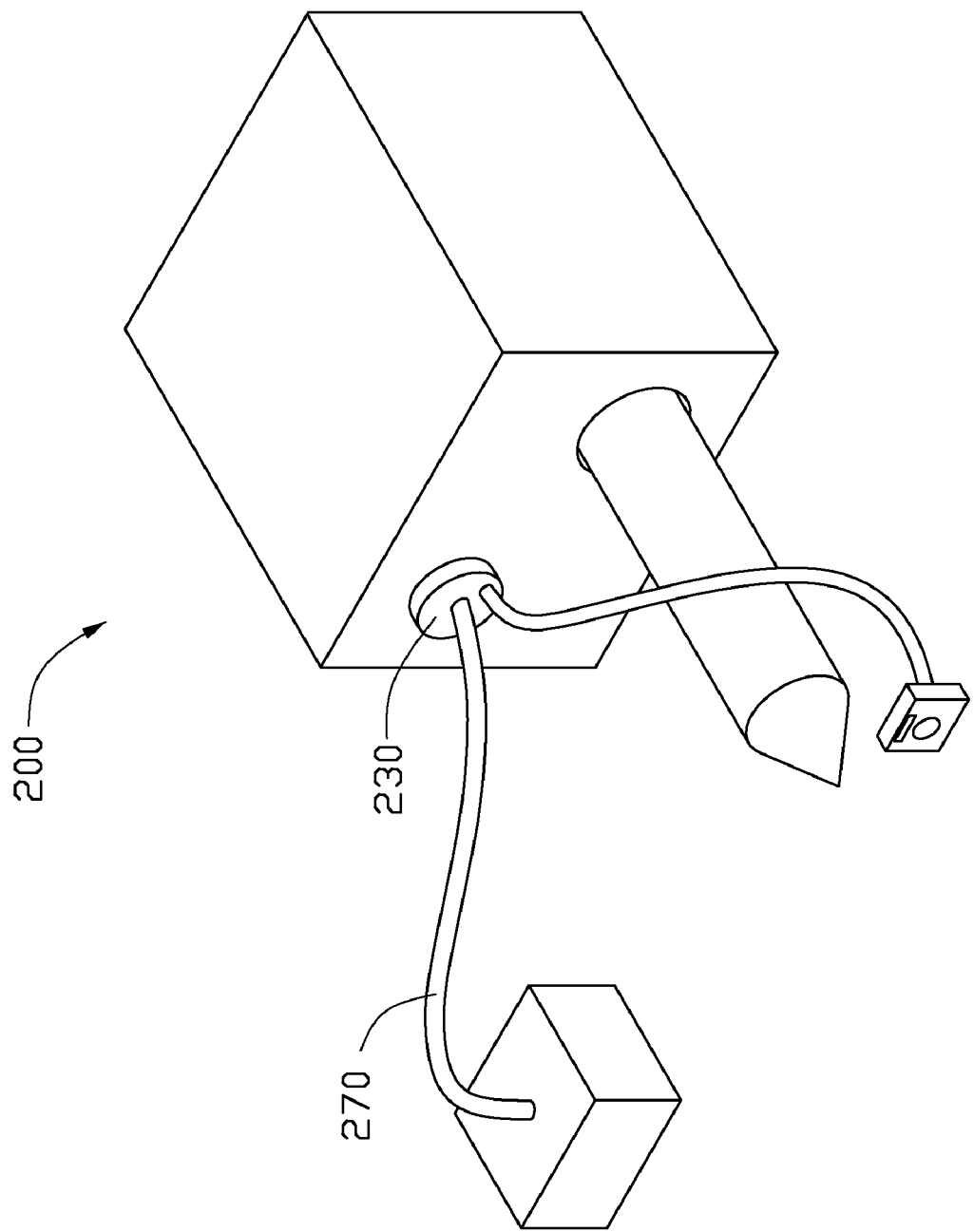

PRECISION MACHINE UTILIZING IMAGING SYSTEM

BACKGROUND

1. Technical Field

The present disclosure generally relates to precision machines, and particularly a precision machine utilizing an imaging system.

2. Discussion of Related Art

Generally, prior to machining a workpiece using a precision machine having a tool such as for cutting, grinding, milling, carving, or other, a distance between the workpiece and the tool need to be monitored to prevent damage to the tool and the workpiece. Therefore, it is desirable to provide a machine utilizing an imaging system for imaging the workpiece and the tool.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

FIG. 3 is an isometric view of a machine according to a second embodiment.

DETAILED DESCRIPTION OF EMBODIMENT

Figure 1:
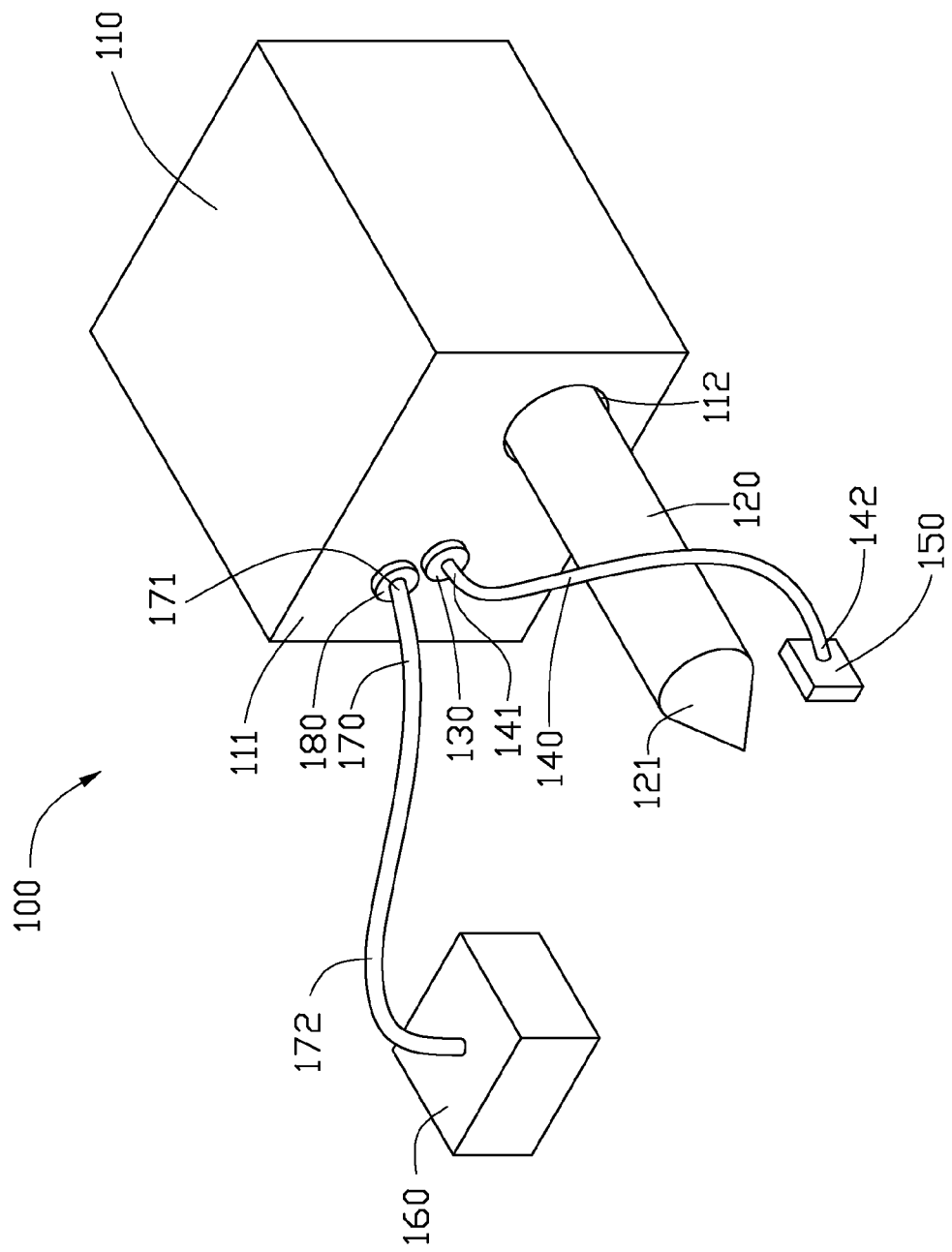
FIG. 1 is an isometric view of a machine in accordance with a first embodiment.

Referring to FIG. 1, a machine 100 of a first embodiment includes a base 110, a cutting tool 120, a first fixing member 130, a first connecting member 140, an imaging system 150, a second connecting member 170, a second fixing member 180 and a reflecting member 160.

The base 110 has an outer wall 111, and defines a bay 112 receiving a tool 120. The bay 112 is defined from the outer wall 111 towards an inner portion of the base 110. Preferably, the outer wall 111 is ferromagnetic, providing strong attachment of magnetic materials thereto.

The cutting tool 120 has a machining portion 121 configured for machining a workpiece, such as shaping, cutting, grinding, or other. The cutting tool 120 moves along and rotates around a central axis thereof under control of a driver (not shown).

The first fixing member 130 is removably attached to the outer wall 111, fixing the first connecting member 140 onto the base 110. Preferably, the first fixing member 130 is magnetic. The first connecting member 140 can be reshaped by application of external force and maintains the new shape thereafter. In the present embodiment, the first connecting member 140 is a braided metal flexible line. The first connecting member 140 includes a first end 141 and an opposite second end 142. The first end 141 of the first connecting member 140 is fixed to the first fixing member 130. The second end 142 is connected with the imaging system 150.

The imaging system 150 images the relationship between machining portion 121 and the workpiece (not shown) to monitor the distance therebetween. The imaging system 150 comprises an image capture module such as a charged coupled device (CCD) or complementary metal-oxide semiconductor (CMOS), a microscope, and a magnifying glass.

The second fixing member 180 is attached on the outer wall 111, and fixes the second connecting member 170 onto the base 110. Preferably, the second fixing member 180 is magnetic. The second connecting member 170 can be reshaped by application of external force and maintains the new shape thereafter. In the present embodiment, the second connecting member 170 is a braided metal flexible line. The second connecting member 170 includes a first end 171 and an opposite second end 172. The first end 171 of the second connecting member 170 is fixed to the second fixing member 180. The second end 172 is connected with the reflecting member 160.

The reflecting member 160 reflects light onto the machining portion 121 and/or the workpiece, such that quality of a captured image from the imaging system 150 is improved. The reflecting member 160 can be a mirror, a reflecting plate, a plate with reflecting film formed thereon, or other.

In addition, the second fixing member 180, the second connecting member 170 and the reflecting member 160 can be omitted. The first and second fixing members 130, 180 can alternatively be removably detached to other walls of the base 110.

Figure 2:
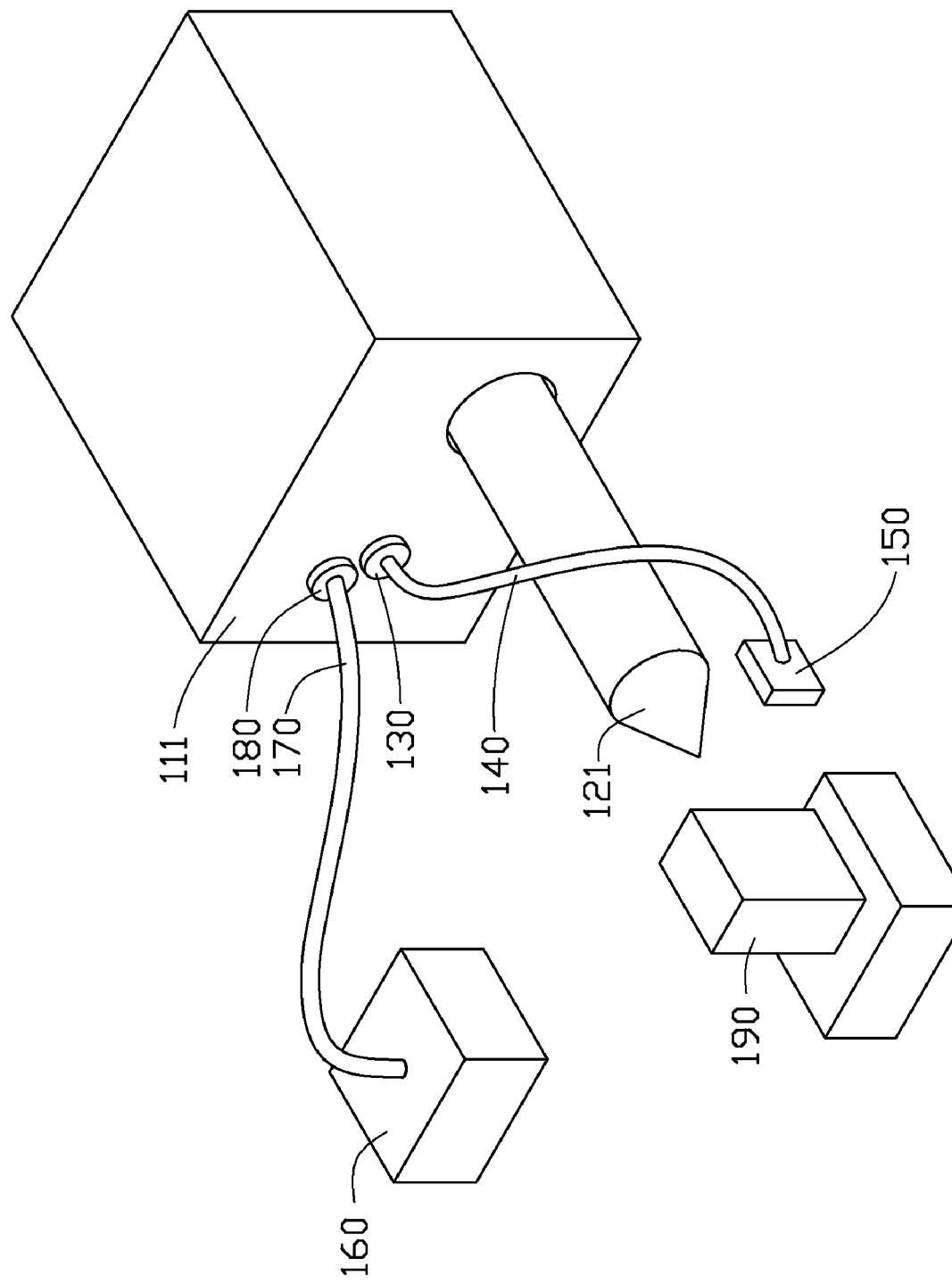
FIG. 2 shows the machine of FIG. 1 machining a workpiece.

Referring to FIG. 2, prior to processing a workpiece 190 with the machine 100, the first and second fixing members 130, 180 are magnetically attached onto the outer wall 111, and position of the imaging system 150 relative to the machining portion 121 is set by adjusting the first connecting member 140 until the imaging system 150 faces the machining portion 121 and the workpiece 190, and the position of the reflecting member 160 is set by adjusting the second connecting member 170 until the machining portion 121 or the workpiece 190 is illuminated with the light reflected by the reflecting member 160.

In the present embodiment, the imaging system 150 and the reflecting member 160 are respectively connected to the base 110 with the first connecting member 140 and the second connecting member 170, and the first and second connecting members 140, 170 are set so as to properly position the imaging system 150 and the reflecting member 160 relative to the machining portion 121. Accordingly, imaging allows the relative positions of the machining portion 121 and the workpiece 190, and damage thereto can be avoided.

FIG. 3 shows another machine 200 according to a second embodiment, differing from the machine 100 only in that the second connecting member 270 is fixed to the first fixing member 230 and the second fixing member is omitted.

While certain embodiments have been described and exemplified above, various other embodiments will be apparent to those skilled in the art from the foregoing disclosure. The present disclosure is not limited to the particular embodiments described and exemplified but is capable of considerable variation and modification without departure from the scope of the appended claims.

What is claimed is:

1. A machine, comprising:
a base comprising an outer wall,
a cutting tool for machining a workpiece mounted on the base,
a first fixing member detachably attached on the outer wall,
a first flexible connecting member comprising a first end and a second end, being capable of maintaining a shape after positioning adjustment thereto by application of a flexing external force, and the first end of the first connecting member being fixed to the first fixing member;

an imaging system, for acquiring an image of the workpiece and the cutting tool, attached to the second end of the first connecting member such that a position of the imaging system can be adjusted by flexing and changing the shape of the connecting member; and a second flexible connecting member having a first end and a second end and being capable of maintaining a shape after positioning adjustment thereto by application of a flexing external force, the first end of the second connecting member being disposed on the outer wall, and a reflecting member for reflecting light onto the cutting tool and/or the workpiece attached to the second end of the second connecting member.

2. The machine as claimed in claim 1, wherein the reflecting member for reflecting light comprises one of a mirror, a reflecting plate, or a plate with reflecting film formed thereon.

3. The machine as claimed in claim 1, wherein the first connecting member comprises a braided metal flexible line.

4. The machine as claimed in claim 1, wherein the second end of the second connecting member is fixed to the first fixing member.

5. The machine as claimed in claim 1, further comprising a second fixing member detachably disposed on the outer wall, the second end of the second connecting member being fixed to the second fixing member.

6. The machine as claimed in claim 5, wherein the second fixing member is magnetically attached to the outer wall.

7. The machine as claimed in claim 1, wherein the first fixing member is magnetically attached to the outer wall.

8. The machine as claimed in claim 1, wherein the second connecting member comprises a braided metal flexible line.

* * * * *